United States Patent [19]

Tayler

[11] Patent Number: 5,071,144
[45] Date of Patent: Dec. 10, 1991

[54] HORSE DRIVEN HITCH CART

[75] Inventor: Baron L. Tayler, Sabillasville, Md.

[73] Assignee: Journeys End International, Inc., Sabillasville, Md.

[21] Appl. No.: 626,717

[22] Filed: Dec. 17, 1990

[51] Int. Cl.$^5$ .............................................. B62C 5/00
[52] U.S. Cl. ........................................ 278/5; 278/15; 278/39; 278/37; 278/51; 278/86
[58] Field of Search .......................... 278/5, 14–17, 278/86, 90, 95, 96, 99, 100, 36, 37, 39, 38, 51; 280/408, 414.5, 416, 416.2, 476.1, 186, 189

[56] References Cited

U.S. PATENT DOCUMENTS

| 109,425 | 11/1870 | Kochensperger | 278/36 |
| 267,602 | 11/1882 | Sharp | 278/37 |
| 279,996 | 6/1883 | Wannamaker | 278/36 |
| 595,640 | 12/1897 | Linnemeier | 278/51 |
| 876,082 | 1/1908 | Ottason | 278/37 |
| 1,047,246 | 12/1912 | Knight | 278/51 |
| 1,071,084 | 8/1913 | Pickering | 278/17 |
| 1,354,796 | 10/1920 | Beene | 278/17 |
| 1,491,650 | 4/1924 | Wiginton | 278/37 |
| 3,472,528 | 10/1969 | Richey et al. | 280/416.2 |
| 4,195,860 | 4/1980 | Helams | 280/415 |

Primary Examiner—David H. Bollinger
Attorney, Agent, or Firm—Epstein, Edell & Retzer

[57] ABSTRACT

A horse-drawn hitch cart has its tongue adjustably positioned laterally, by means of a clevis and plural hand-actuable locking pins, along an apertured drawbar suspended forwardly and below the floor level of the cart frame to be rotatable about a laterally-extending axis. A yoke bar is attached to the distal end of the tongue by means of a yoke ring circumscribing the tongue between two longitudinally spaced and hand-actuable stop pins preventing the ring from being disengaged from the tongue. The proximal stop pin position is adjustable to accommodate different length horses by virtue of a series of through holes defined along the tongue rearwardly of the most distal stop pin. A clutch assembly, actuable from the cart floor by means of a lever, permits a ground driven power takeoff unit to be selectively engaged quickly and easily without requiring the driver to leave his seat. A bias spring and a mechanical stop acting on the lever prevent inadvertent engagement and disengagement, respectively, of the clutch. Selective lateral positioning of a towed implement is made possible with a three-point hitch unit modified to permit rotation between the drive arms and the sidelinks about respective axes disposed in vertical planes.

20 Claims, 3 Drawing Sheets

HORSE DRIVEN HITCH CART

BACKGROUND OF THE INVENTION

1. Technical Field

The present invention pertains to hitch carts adapted to be drawn by draft animals so as to pull and operate farm implements and the like.

2. Discussion of the Prior Art

Hitch carts drawn by draft animals, typically horses, are still widely used on small farms to pull objects and farm implements and to operate farm implements from a power takeoff unit driven by the cart wheels. A typical commercially available hitch cart of this type suffers from a number of disadvantages. For example, the cart tongue tends to bend and deform at its proximal end when the draft animals make relatively sharp turns. In addition, although the mounting position of the tongue is purported to be transversely adjustable, such positional adjustment can only be effected with tools by loosening nuts from threaded bolts, removing the bolts, and then re-inserting the bolts and re-attaching the nuts when the tongue has been re-positioned on the frame. This procedure can be extremely difficult and time consuming, particularly when the bolt threads have been damaged, causing the bolt to bind and resulting in the bolt being wrenched off in the nut. Moreover, the mounting assembly for the tongue includes an L-shaped beam secured through the tongue along one leg of the beam while the other leg of the beam is slidably received in the crosspiece of a T-bar. The stem of the T-bar is secured to the cart frame by means of two laterally spaced L-brackets. The result is that the tongue axis and the T-bar stem are offset so that turning forces applied to the cart by a laterally centered tongue are not applied to the lateral center of the cart, thereby creating unequal turning torques for left and right turns. Further, the spacing between the L-brackets permits angular slack in the entire tongue mounting assembly with the result that the forward end of the tongue is capable of moving more than two feet laterally before any effect is achieved at the cart during a turn.

Another disadvantage with the aforesaid prior art commercially available hitch cart relates to the yoke bar. Typically, the tongue is either a hollow rectangular metal tube or solid wooden shaft having aligned through holes at its distal end. In the wooden tongue a threaded eye bolt extends through a hole and is threadedly secured by a nut, or the like. The yoke is connected to the eye bolt and, to change the yoke position on the tongue, the eye bolt must be removed with tools and then placed through another hole. In the case of the hollow metal tongue, a chain has one end secured to the bolt inside the tongue and extends out of the tongue through a ring that encircles and is slidable along the tongue. The yoke bar is attached to the ring so that the position of the yoke bar along the tongue changes as the ring slides along the tongue. A major problem with these arrangements is that if the harness is adjusted incorrectly or breaks, the ring readily slides over the distal end of the tongue, thereby totally disengaging the yoke assembly from the tongue and creating a dangerous condition.

Another problem associated with the aforementioned prior art hitch carts relates to the three point hitch assembly at the rear of the cart and, particularly, to the limited transverse angular motion permissible between the hitch assembly and the towed farm implement. Specifically, the sidelinks of the hitch assembly are secured to the cart by means of a turnbuckle, or the like, providing for rotation only about a horizontal axis. Rotation about a second axis perpendicular to the horizontal axis, as is needed when adjusting a towed implement laterally, is provided only by slack in the turnbuckle joint and, as this slack is limited, the joint components tend to bend and deform during sharp turns during prolonged lateral offset of the implement.

Finally, the aforesaid prior art hitch cart utilizes a ground driven power takeoff assembly arranged such that a differential cam must be aligned by hand, often requiring the use of a crowbar to turn the cam, or having the horses to take a step backward while the teamster is off the cart. Once the cams are aligned they must be slid together, a procedure that can be difficult in cold weather when lubricating grease is extremely viscous. After the cams are placed together, the teamster must tighten a thumb screw, the latter often becoming loose during normal operation in the power takeoff unit. This procedure for engaging the power takeoff is quite cumbersome. Moreover, considering that the teamster is required to be on the ground adjusting the differential cams while the horses are uncontrolled, the technique is somewhat less than safe.

OBJECTS AND SUMMARY OF THE INVENTION

It is therefore an object of the present invention to provide a horse drawn hitch cart wherein the above-described disadvantages and problems are substantially eliminated.

Another object of the present invention is to provide a tongue assembly for a hitch cart that can be laterally re-positioned quickly and without the use of tools, that is sufficiently strong to substantially eliminate the possibility of bending during turns, and that transmits all of the turning forces to the cart at a point on the tongue axis.

It is another object of the present invention to provide a mounting arrangement for a yoke bar on the tongue assembly wherein the bar is prevented from becoming disengaged from the tongue, and wherein the proximal limit position of the yoke bar along the tongue can be easily and quickly adjusted.

A further object of the present invention is to provide a horse drawn hitch cart having a three point hitch assembly wherein the sidelinks are capable of pivotal movement about both a horizontal axis and a second axis oriented perpendicular to the horizontal axis, i.e., in a vertical plane.

Still another object of the present invention is to provide a horse drawn hitch cart having an improved clutch assembly for a ground driven power takeoff unit whereby clutch engagement and disengagement can be safely and easily effected by a teamster without leaving his or her seat on the cart, and wherein inadvertent engagement and disengagement of the clutch is prevented.

In accordance with one aspect of the present invention, a horse drawn hitch cart includes a mounting arrangement wherein the proximal end of the cart tongue includes a clevis with plural pairs of vertically aligned apertures alignable with respective apertures in an apertured drawbar suspended forwardly and down from the cart frame so as to be pivotable about a laterally extending axis. Engagement is effected by plural pins, such as hitch pins, lynch pins, or the like, that are readily inserted in and removed by hand from the drawbar apertures in a matter of seconds. The tongue axis is laterally centered with respect to the clevis to assure that the turning forces are applied at a point on the tongue axis directly to the cart. By engaging a plurality of drawbar apertures, preferably three, the clevis prevents angular slack in the tongue relative to the cart. In addition, turning forces are applied at the relatively strong plural pin engagement rather than as bending torque on the hollow and relatively weak tongue shaft. Further, pivotability of the drawbar permits proper orientation of the tongue relative to the horses in its longitudinal plane, regardless of the topography of the path of the cart.

In another aspect of the present invention, the distal end of the tongue is formed as a forward clevis through which a clevis hitch or lynch pin is vertically secured. In addition, axially spaced pairs of vertically aligned apertures are provided on the tongue for a predetermined distance rearwardly of the forward clevis. A second pin can be placed through any pair of these apertures, depending upon the length of the draft horses. A ring secured to the yoke bar is disposed about that portion of the tongue located between the two step pins and has a diameter smaller than the length of the pins. Accordingly, the ring and yoke bar are limited by the clevis pin from becoming disengaged from the tongue, and are likewise limited in rearward movement by the adjustably positionable stop pin.

In a still further aspect of the present invention, a clutch assembly is provided for the power takeoff unit. A hand operated lever adjacent the teamster's seat is pivotally mounted to translate a slidable clutch jaw into and out of engagement with a ground driven clutch jaw. A spring serves to bias the lever toward the disengaged position to prevent accidental actuation of the clutch. When the lever is operated and the clutch is engaged, a locking L-bracket, pivotally secured to the lever, is caused to drop from a raised platform whereby a vertical leg of the bracket is urged into abutting relationship with the platform riser to prevent inadvertent pivoting of the lever and resulting disengagement of the clutch. A clutch pedal is selectively actuable to pivot the bracket upwardly, thereby permitting the lever to clear the rear end and be returned to the disengaged position.

BRIEF DESCRIPTION OF THE DRAWINGS

The above and still further objects, features and advantages of the present invention will become apparent upon consideration of the following detailed description of a specific embodiment thereof, particularly when considered in conjunction with the accompanying drawings wherein like reference numerals in the various figures are utilized to designate like components, and wherein.

DESCRIPTION OF THE PREFERRED EMBODIMENTS

Figures 1, 2, 2A, 3, 4, 4A:
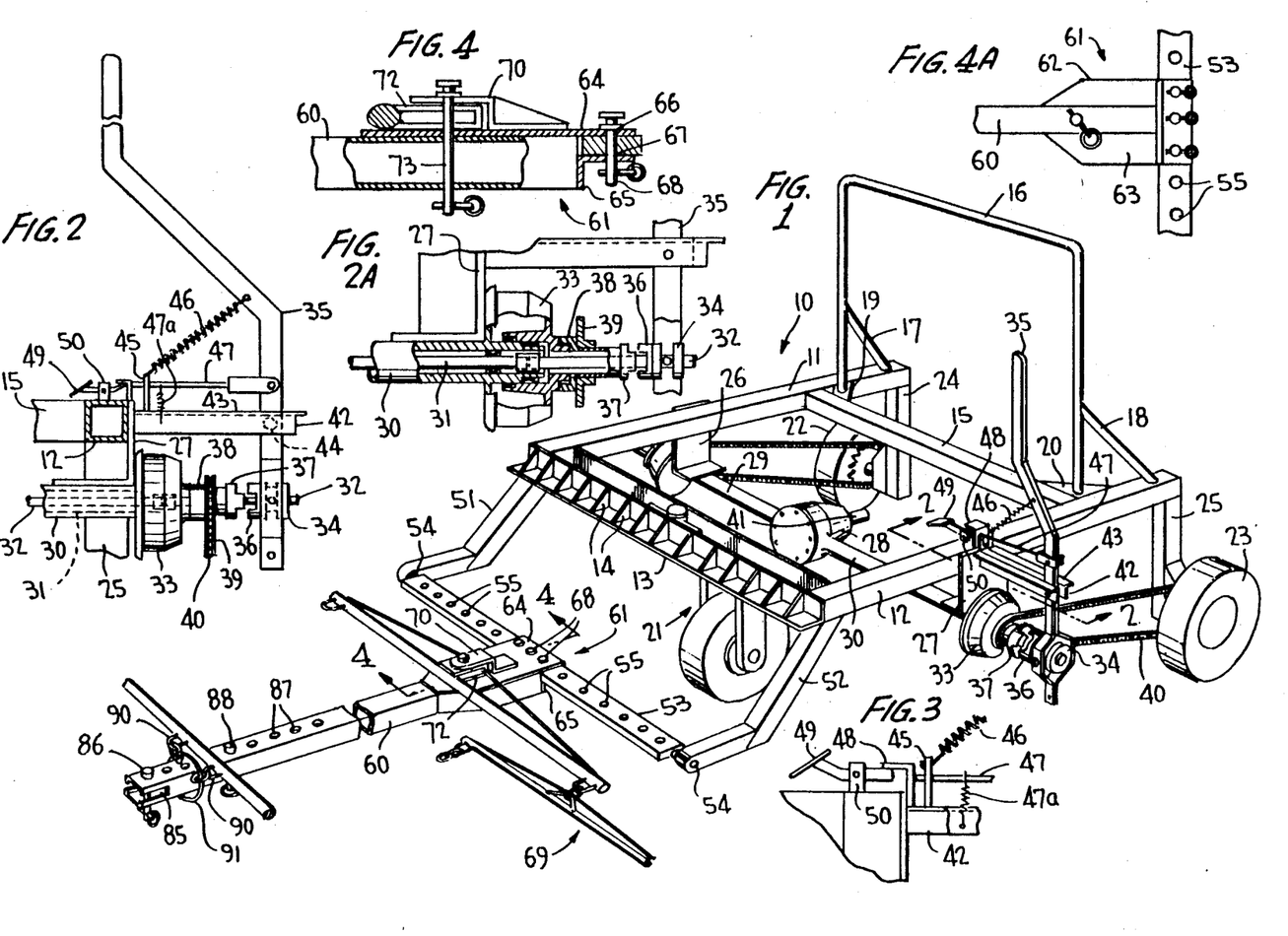
FIG. 1 is a view in perspective of the hitch cart assembly of the present invention.
FIG. 2 is a front view in elevation, taken along lines 2—2 of FIG. 1, showing the clutch assembly of the hitch cart in its disengaged position.
FIG. 2A is a cut-away view similar to FIG. 2 but partly in section.
FIG. 3 is a detailed drawing of the clutch assembly actuator shown in the engaged position of the clutch.
FIG. 4 is a side view in section taken along lines 4—4 of FIG. 1.
FIG. 4A is a bottom view in plan of the clevis shown in FIG. 4.

Referring more specifically to the accompanying drawings, a hitch cart 10 constructed according to the present invention comprises a rectangular frame having two sides 11 and 12 in the form of tubes with square transverse cross sections. A front lateral support 13 is secured between the forward ends of sides 11 and 12 by any suitable means such as brazing, welding, or the like. Support 13 has a L-shaped cross section with a vertical leg secured at its ends to the sides 11 and 12 and a horizontal leg projecting forwardly from the bottom edge of the vertical leg. Multiple triangular gussets 14 are spaced along support 13 to provide structural support between the vertical and horizontal legs. A crosspiece 15 is secured at its ends through respective sides 11 and 12 to provide lateral support for the frame at a location proximate but forward of the rear of the cart 10. The cart typically includes horizontal flooring (not shown) and a driver's seat (not shown) disposed thereon, but these do not constitute part of the invention and have been omitted from the drawings in order to facilitate illustration of the features of the invention.

A pair of horizontal braces 19, 20 extend obliquely rearward, at an angle of approximately forty-five degrees from crosspiece 15 and respective sides 11 and 12. A rollover protection bar 16, in the form of a generally inverted U-shaped pipe, has its vertical legs mounted on respective braces 19, 20. Support struts 17, 18 extend rearwardly and down from respective vertical legs of rollover protection bar 16 to respective sides 11 and 12 in order to strengthen the rollover bar mounting.

A front wheel assembly 21 is suspended beneath the frame, in any suitable manner, just rearward of the forward end of the cart frame. Typically, the front wheel assembly includes a vertical shaft (not shown) journaled in the vehicle floor or other structure to permit the front wheel to turn as dictated by the direction of draft forces applied to the cart. Rear wheels 22, 23 are independently mounted on respective axles that are journaled in corresponding wheel supports 24, 25 depending from the rearward ends of respective sides 11, 12. Wheels 21, 22 and 23 are preferably flat-proof tires that freely roll as the cart is pulled by the draft animals.

Intermediate the ends of sides 11 and 12 are respective depending brackets 26 and 27 on which a power takeoff assembly is mounted transversely across the cart. The power takeoff assembly includes a laterally centered differential unit 28 from which two tubular axle housings 29, 30 extend transversely below the cart frame, the housings being welded or otherwise secured to the brackets 26, 27, respectively. Axle 31 is disposed concentrically in housing 30 and is coaxially coupled to a stub axle 32 by means of a brake assembly 33 serving also as an axle coupling in a conventional manner to permit axle 31 to rotate with the stub axle. The stub axle is keyed to a slidable clutch jaw 36 having a bearing unit 34 secured to the lower pivot portion of a clutch actuator lever 35. Slidable clutch jaw 36 and its bearing unit 34 are keyed to stub axle 32 so as to be rotatable therewith in its lever mounting, but are movable laterally along the stub axle with the bottom pivot portion of lever 35 when the lever is pivoted in a vertical plane disposed transversely of the cart. The teeth of slidable clutch jaw 36 face laterally inward along the stub axle toward the teeth of a driven clutch jaw 37. This driven clutch jaw is secured about a sleeve 38 disposed concentrically about but spaced radially from stub axle 32 so as to be rotatable independently of the stub axle when the clutch mechanism is disengaged. A driven sprocket 39 is also disposed on sleeve 38 and is linked by a chain 40 to a drive sprocket keyed to the axle of rear wheel 23. When the clutch is disengaged, driven sprocket 39, sleeve 38 and driven clutch jaw 37 "float" or remain disengaged from stub axle 32 and, therefore, rotate about the stub axle as rear wheel 23 rotates. The facing clutch jaws 36 and 37 may be engaged by sliding the slidable jaw 36 along stub axle 32 in the manner described hereinbelow. When the clutch jaws are engaged, rotation of rear wheel 23, as caused by movement of the cart, drives driven sprocket 39 by means of chain 40 to cause driven clutch jaw 37 to rotatably drive slidable clutch jaw 36. The rotation of clutch jaw 36 rotatably drives stub axle 32, in turn driving differential unit axle 30 via coupling unit 33. This causes a power takeoff output shaft 41 to be rotated at the differential unit to drive appropriately connected farm implements.

The opposite rear wheel 22 has a similar sprocket and chain drive arrangement connected to rotate the opposite differential unit axle located in tubular housing 29; however, no clutch arrangement is provided for this axle. The differential unit, as is conventional with such units, causes the output shaft 41 to rotate and drive connected implements only when both of the differential unit axles are driven. Accordingly, it is only when clutch jaws 36 and 37 are engaged that the power takeoff is operatively driven.

The clutch actuator lever 35 is an elongated rod pivotally mounted on a bracket 42 in laterally spaced relation to side 12 of the cart frame. Bracket 42 is made from two elongated bars of L-shaped cross section positioned in spaced back to back relation such that their vertical legs are spaced and parallel while their horizontal legs are co-planar to define a slotted upwardly-facing shelf surface 43. That surface is disposed horizontally in a plane slightly below the top surface of frame side 12 to effectively define a step between the two levels whereby the top surface of frame side 12 serves as a platform. Lever 35 is pivotally engaged by a pivot pin 44 proximate the distal end of the bracket 42 and in the space between the two elongated L-shaped bars so as to be pivotable in a plane oriented laterally of the cart and about a horizontal axis extending parallel to and spaced from frame side 12. The lower pivot portion of lever 35 (i.e., the portion below pivot pin 44) includes two bar members joined to define a frame for retaining bearing 34 of the slidable clutch jaw 36. The upper pivot portion of the lever is sub-divided into three segments, namely a first segment extending directly upward from pivot pin 44, a second or intermediate segment bent inwardly toward the cart to form an angle of approximately one hundred thirty-five degrees with respect to the first segment, and a third segment bent to extend vertically upward from the second or intermediate segment to thereby define a lever handle. The bends in lever 35 are provided to position the handle segment proximate the teamster or driver of the cart while the lower pivot portion of the lever is laterally displaced from the cart.

A generally U-shaped retainer 45 has its base mounted on shelf 43 in spaced relation to the cart frame side 12 but closer to that side than to lever 35. The retainer is thusly disposed in a vertical plane extending parallel to the longitudinal dimension of the cart. A bias spring 46 is secured between retainer 45 and the intermediate segment of lever 35. It is the function of bias spring 46 to pivotally urge the upper pivot portion of the lever toward the cart, thereby biasing the lever to the disengaged position of clutch jaws 36 and 37. Bias spring 46 is typically a helical compression spring.

Also associated with lever 35 is a release arm 47 pivotally secured to the first segment of the upper portion of the lever. Release arm 47 extends substantially horizontally through the slot defined between the vertical legs of retainer 45, and terminates at a location proximate and above the cart frame side 12. An L-shaped bracket 48 is secured to the terminal end of release arm 47 and is mounted with one leg oriented vertically and the other leg extending horizontally inward toward the cart from the top edge of the vertical leg. A pedal unit 49 is pivotally mounted on a bracket 50 affixed to the top surface of frame side 12 to permit pivotal pedal movement in a vertical plane oriented laterally of the cart. Pedal unit 49 includes a bent distal end that slidably engages the underside of the horizontal leg of the L-bracket 48 and pivots upwardly to cause that bracket to rise when the proximal end of the pedal unit is depressed. A spring 47a may be affixed between release arm 47 and shelf 43 to pivotally bias the release arm downward and offer a resistive "feel" to pedal actuation.

In the disengaged condition of the clutch assembly (FIG. 2), bias spring 46 pivotally pulls lever 35 to its extreme counter-clockwise position wherein the clutch jaws 36, 37 are spaced from one another. In this condition, L-bracket 48 has the bottom edge of its vertical leg resting on the platform formed by the top surface of frame side 12. In order to engage the clutch, the teamster pushes the lever handle laterally outward, causing the lever to rotate clockwise against the bias force applied by spring 46. The lower portion of the lever 35 moves the slidable clutch jaw 36 into engagement with the driven clutch jaw 37 to thereby activate the power takeoff unit. As lever 35 pivots clockwise, release arm 47 and the attached L-bracket 48 move laterally outward along the platform defined by the top surface of frame side 12. When the lower edge of the L-bracket reaches the outer edge of the platform, the L-bracket and release arm 47 pivotally drop toward shelf 43. Under such circumstances, as illustrated in FIG. 3, the inward facing surface of L-bracket 48 abuts the riser formed between shelf surface 43 and the platform surface of frame side 12. Thus, when the teamster releases the lever handle, bias spring 46 is prevented from rotating the lever back to its extreme counter-clockwise position by the abutting engagement between the vertical L-bracket leg and the platform riser. The clutch cannot, therefore, become disengaged inadvertently. To intentionally disengage the clutch, it is necessary to depress the inboard side of the pedal unit to cause the outboard side thereof to pivotally lift the L-bracket 48 and release arm 47 above the riser. When the L-bracket clears the riser, the teamster then pulls on lever 35 causing it to pivot counter-clockwise and disengage the clutch. The bias spring 46 maintains a bias force on the lever to keep the clutch assembly in its disengaged condition (FIG. 2).

Projecting forwardly and downwardly from the ends of frame sides 11 and 12 are respective drawbar supports 51, 52. The upper portions of these supports subtend an angle of approximately forty-five degrees with horizontal; the lower ends extend horizontally forward. Each drawbar support 51, 52 has defined thereon a bearing 54, the two bearings 54 being horizontally aligned along a common horizontal pivot axis. A front hitch drawbar 53 is mounted in bearings 54 for pivotal movement about the horizontal pivot axis. Drawbar 53 is an elongated plate with a series of apertures 55 defined through its thickness in spaced relation along the drawbar length. The opposite ends of the plate are provided with pivot stubs journaled in bearings 54 whereby the drawbar is supported by supports 51, 52 in fixed vertical and lateral relation to the cart frame but pivotable about the horizontal pivot axis defined by the aligned bearings 54.

A cart tongue 60 takes the form of an elongated tube of square cross section. The proximal end of tongue 60 is secured to a hitch clevis assembly 61 configured to engage front hitch drawbar 53 at various lateral positions along the drawbar length. Clevis assembly 61 comprises two short guide tubes 62, 63 arranged in horizontally spaced parallel relation to define therebetween a channel having a width substantially corresponding to the width of tongue 60. The distal ends of the guide tubes are distally tapered toward the channel opening and sealed; the proximal ends terminate in a common vertical plane. A top plate 64 is welded or otherwise secured to the top surfaces of guide tubes 62, 63 and is peripherally contoured at its distal and side edges to be flush with corresponding peripheral surfaces of the guide tubes. The proximal edge of the top plate extends rearwardly of guide tubes 62, 63 to provide an overhang having three equally spaced apertures 66 defined therethrough in laterally aligned relation. The spacing between apertures 66 is the same as the spacing between holes 55 in drawbar 53.

An L-bracket 65 has the outer surface of a vertical leg secured to the co-planar proximate ends of guide tubes 62, 63. The horizontal leg of L-bracket 65 extends rearwardly from the upper edge of the vertical leg in spaced parallel relation to and below the overhang formed by the proximal end of cover plate 64. The spacing between cover plate 64 and the horizontal leg of bracket 65 is chosen to permit the thickness dimension of drawbar 53 to be slidably received therebetween. The horizontal leg of the bracket has three equally spaced apertures 67 defined therethrough in vertical alignment with respective apertures 66 in the cover plate overhang.

The proximal end of tongue 60 is disposed in the channel defined between guide tubes 62, 63 with the proximal end of the tongue abutting the vertical leg of bracket 65. The guide tubes and tongue are preferably fabricated from tubing having the same cross section so that there is a planar bottom surface for the assembled tongue and clevis. Tongue 60, guide tubes 62 and 63, top plate 64 and bracket 65 are welded together to provide a strong integral structure for the clevis assembly 61 at the proximal end of the tongue. This structure can be secured to drawbar 53 in a variety of selective lateral positions by inserting the drawbar between the cover plate overhang and bracket 65 and then laterally aligning the three pairs of aligned apertures 66, 67 with any three respective adjacent holes 55 in the drawbar. Three manually securable and releasable pins 68 (e.g., lynch pins, hitch pins, etc.) are then inserted through the three groups of aligned apertures and holes and secured in place. To change the lateral position of the tongue relative to the cart, it is only necessary to manually release the three pins 68, slide the clevis assembly 61 until the apertures 66, 67 are aligned with different drawbar holes 55, and manually insert and secure pins 68 in those aligned apertures and holes.

Figure 7:
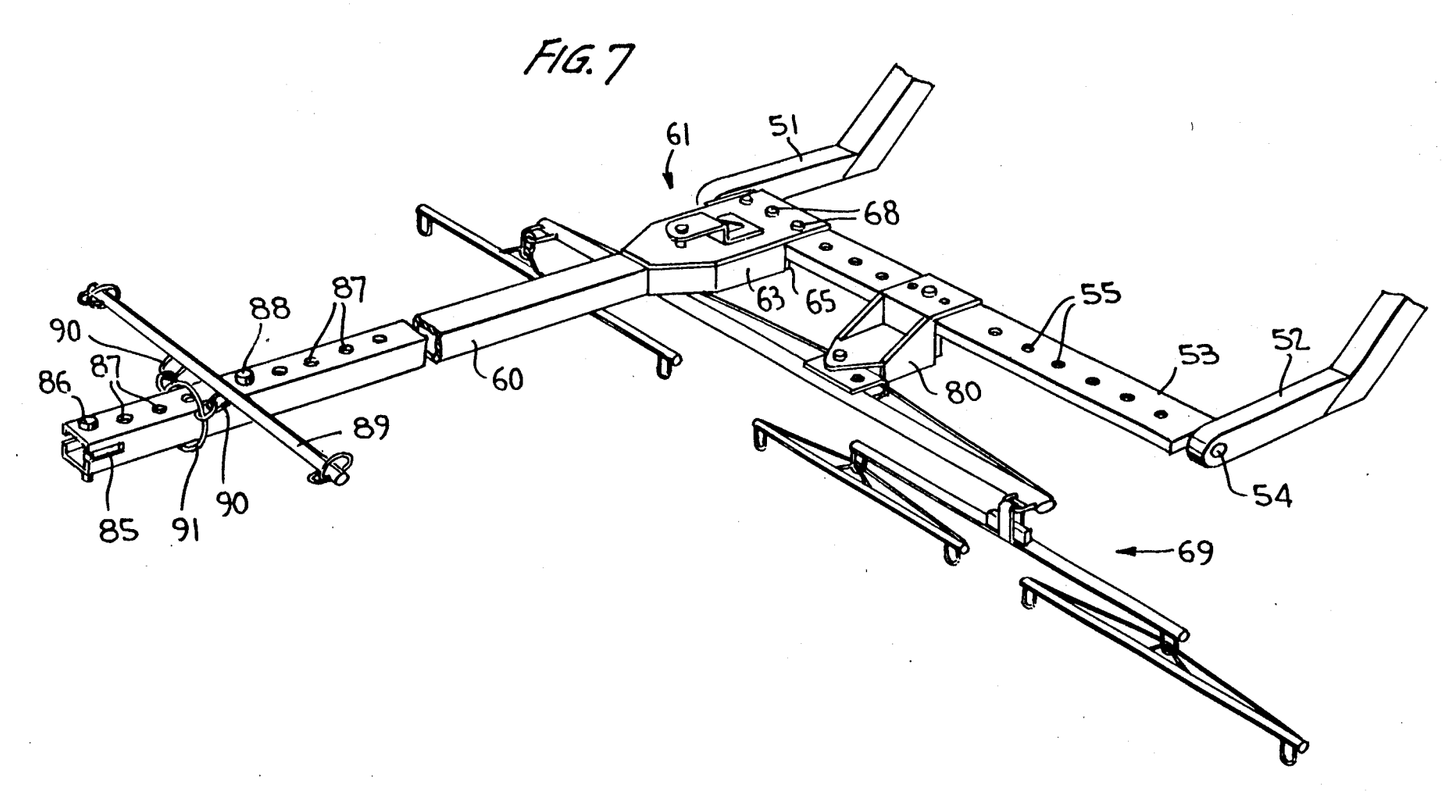
FIG. 7 is a view in perspective of a portion of the front of the cart of FIG. 1 showing the proximal end of the tongue laterally repositioned and a tripletree hitch assembly secured to the drawbar.

On the top surface of cover plate 64 there is welded or otherwise secured an attachment bracket 70 for removably securing a doubletree hitching unit 69 to the clevis assembly 61. Bracket 70 is formed in three sections, namely a base plate secured to the cover plate by welding, or the like, a vertical riser at the forward edge of the base plate, and a horizontal raised section extending forwardly from the upper edge of the riser in spaced parallel relation to the cover plate. The raised section of bracket 70 combines with cover plate 64 to form a receptacle for engaging the doubletree hitching unit 69. In this regard, the raised plate of bracket 70 has a hole defined through its thickness and aligned with corresponding holes in tongue 60. A mounting portion 72 of the doubletree hitching unit has appropriate apertures defined therethrough at a location that is alignable with holes 72 and the holes in tongue 60. A manually securable and removable pin 73 can be inserted through the aligned holes to secure the doubletree hitching unit 69 to the clevis, whereby the hitching unit can pivot about pin 73 as necessary during normal operation. The tug lines for two horses can be hitched to hitching unit 69, one horse on either side of the tongue 60, in a conventional manner to enable the horses to pull the cart. It is also possible to secure three horses to the cart, one horse along one side of the tongue and two horses along the other. To do this, one would position the tongue 60 and its clevis assembly 61 near or at one end of the drawbar 53 as illustrated in FIG. 7. A further clevis 80 is then secured to drawbar 53 near or at the middle of the drawbar. Clevis 80 provides a similar three-pin engagement with the drawbar 53 and has a forward end adapted to receive the mounting member 81 of a tripletree hitching unit by means of a single pin engagement. The tripletree hitching unit has a single hitching apparatus at one of its ends and a double hitching apparatus at the other of its ends. When the tripletree unit is mounted on clevis 80 as described above, the cart tongue 60 extends between the single and double hitching units so that one horse is hitched along one side of the tongue while two horses are hitched along the other side.

It must be noted that drawbar 53 is supported forwardly of the cart frame and below the cart floor level in a manner to be rotatable about the lateral axis defined by bearings 54. Accordingly, tongue 60 is pivotable about that axis so that it positionally self-adjusts in relation to the draft horses in its longitudinal plane to accommodate topography variations that vertically offset the cart relative to the horses.

The distal end of tongue 60 is bifurcated horizontally to define a tandem team clevis 85. This clevis is utilized to attach a doubletree of a forward team of horses. The bifurcated sections on opposite sides of the clevis slot have respective aligned apertures defined therethrough for receiving a distal stop pin 86. Pin 86 is typically a lynch pin, hitch pin, or other manually securable and releasable pin. A plurality of additional pairs of vertically aligned apertures 87 are similarly defined through opposite walls of the tubular tongue 60, the pairs of apertures being spaced longitudinally along the forward section of the tongue. A second stop pin 88 is inserted through a selected pair of apertures 87 depending upon the length of the draft horses to be hitched to the cart.

A yoke bar 89 includes at least two hooks 90 secured thereto for engaging links surrounding a yoke ring 91. The yoke bar is positioned so that its hooks 90 are disposed on opposite sides of the tongue 60. Yoke ring 91 circumscribes the portion of the tongue disposed between pins 86 and 88. The diameter of ring 91 is greater than the largest transverse dimension of tongue 60 but smaller than the length of pins 86 and 88. Accordingly, the yoke ring 91 is free to move longitudinally along the tongue between the pins but is prevented from moving distally beyond pin 86 or proximally beyond pin 88. Yoke bar 89 is thereby prevented from becoming disengaged from the tongue, yet is free to move rearwardly to the limit imposed by proximal pin 88. The position of pin 88 is determined by the length of the draft animals and provides for correct harness adjustment and maximum movement of the horses without permitting them to back into the cart structure. Although not illustrated in FIG. 1 to preserve illustrative clarity of the yoke bar engagement with the tongue, it is understood that the yoke bar is hitched to the yoke straps (not illustrated) on the draft horses.

Figure 5:
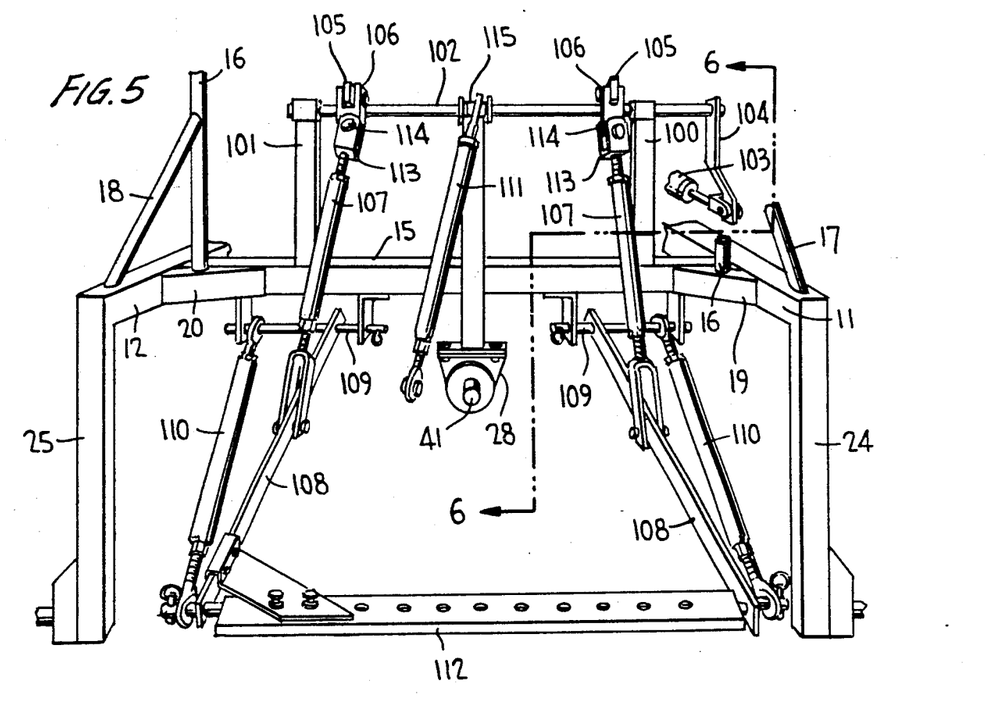
FIG. 5 is a rear view in elevation of the hitch cart of FIG. 1, showing the three-point hitch assembly for towing farm implements.
Figure 6:
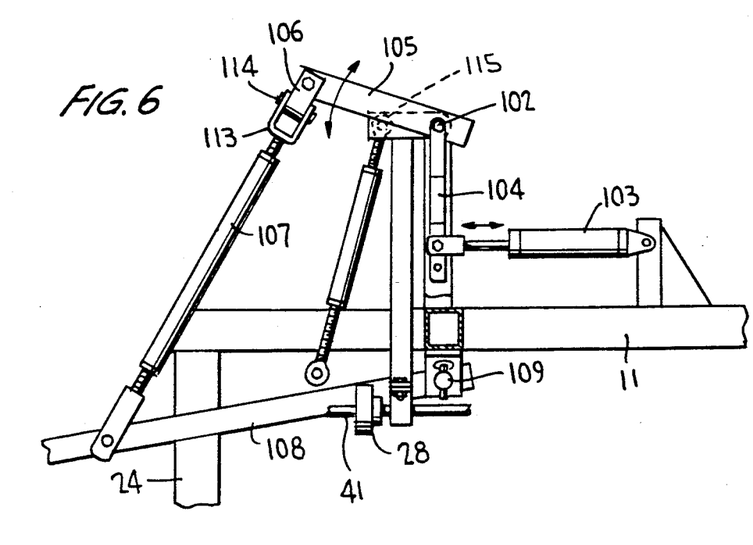
FIG. 6 is a side view in elevation and partial section taken along lines 6—6 of FIG. 5.

Referring specifically to FIGS. 5 and 6, the three-point hitch assembly is conventional in all respects except for the improvement described hereinbelow. The conventional portion of the assembly includes vertical stanchions 100, 101 mounted on the frame crosspiece 15 and rotatably supporting a horizontal drive shaft 102. The latter is caused to rotate by means of a controllable hydraulic motor (not shown), a link 103 of which drives a crank 104 secured to one end of shaft 102 in rotatable driving engagement. Driver arms 105 have one end secured to shaft 102 to rotate therewith, and an opposite end secured in a knuckle or turnbuckle joint 106 to respective sidelinks 107. The sidelinks, in turn, are pivotally connected to respective lift arms 108 at a point intermediate the ends of the lift arms. The proximate ends of the lift arms 108 are mounted on respective hand-removable horizontal pivot pins 109 to permit the lift arms to freely rotate about those pins. At their distal ends the lift arms receive respective stub shafts fixed at the ends of a lift drawbar 112. Adjustable stabilizer arms 110 also extend between respective pivot pins 109 and the drawbar stub shaft. A toplink 111 for the hitch is the third link of attachment and is secured by means of a bushing 115 at its proximal end to be freely rotatable about drive shaft 102.

A suitable farm implement may either be connected to drawbar 112 in a conventional manner or connected directly to the three-point hitch assembly with the drawbar removed. The connected implement can be lifted by hydraulically rotating the drive shaft 102 to thereby rotate drive arms 105. These arms, in turn, lift sidelinks 107 through the turnbuckle connections 106 to pivot the lift arms 108 upward and thereby raise drawbar 112 with its attached farm implement load. The adjustable stabilizer arms 110 may then be set to assist in maintaining the raised load in the desired position.

The foregoing describes a conventional three-point hitch assembly. A disadvantage inherent in such a system occurs during turns or other times that lateral forces are exerted between the drawbar load and the drive arms 105 Typically, the rotatable joint is severely stressed and tends to bend unless considerable lateral slack is provided between the two pivotable elements 105, 107 along their pivot axis. Even so, during sharp turns, such slack is insufficient to prevent potentially damaging bending forces at joint 106. According to the present invention, the connections between driver arms 105 and sidelinks 107 are supplemented by respective swivel joints 113 disposed between turnbuckles 106 and the sidelinks. The swivel joints 113 typically include a U-shaped member that is fixedly secured to the proximal end of sidelink 107 and across which a fixed pivot pin 114 extends. A portion of the distal end of turnbuckle 106 pivotally engages pivot pin 114 to permit the entire turnbuckle structure to rotate about the pivot pin. Pivot pins 114 are disposed in vertical planes that extend longitudinally relative to the cart so that swivel joints 113 provide the capability of load re-positioning the load laterally relative to the cart. This capability substantially eliminates bending and breakage stress at the juncture between driver arms 105 and sidelinks 107.

The various elements and components described herein are typically made of steel and are preferably secured together by welding. Other materials and means of attachment may be employed to the extent that they are consistent with the functional requirements described herein for the various components of the invention. Although tubular beams of square cross-section are preferred for the tongue, the cart frame and other support members, other cross-sections (e.g., circular, etc.) or even non-tubular members, may be employed.

From the foregoing description it will be appreciated that the present invention makes available a novel horse driven hitch cart wherein major disadvantages of prior art hitch carts have been substantially eliminated. The tongue assembly can be laterally repositioned in less than a minute without the use of tools by virtue of the pin engagement between clevis assembly 61 and the front hitch drawbar 53. The widened clevis structure provided by the guide bars 62, 63 combines with the three-pin engagement between the clevis and the drawbar to significantly strengthen the proximal end of the tongue assembly and preclude bending and breakage of the tongue at its proximal end. Further, the laterally centered position of the tongue in the clevis assures that the turning forces efficiently applied to the cart at a point on the axis of the tongue with no intermediate torque produced between the tongue and the drawbar. The two yoke bar stop pins combine with the series of apertures in the distal end of the tongue to provide a selectible range of movement of the yoke bar along the tongue, which range can be adjusted in a matter of seconds by simply changing the position of the hand actuated pin 89. The clutch assembly, actuated from atop the cart structure, permits selected engagement of the ground driven power takeoff unit without requiring the teamster to leave the cart. Inadvertent engagement or disengagement of the clutch is prevented by the unique clutch actuation system. The provision of a swivel joint for the side arms of the three-point hitch eliminates bending and breakage in the hitch structure when the towed farm implement is laterally re-positioned.

Having described a preferred embodiment of a new and improved horse drawn hitch cart assembly constructed in accordance with the present invention, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A horse driven hitch cart assembly for towing and operatively driving farm implements comprising:

a cart frame having front and back ends and first and second sides;

an elongated tongue for stably positioning one or more draft horses forwardly of said front end, said tongue having proximal and distal ends;

tongue attachment means for securing the proximal end of said tongue to extend forwardly from said cart;

yoke means for attachment to one or more draft horse harnesses and including a yoke bar;

yoke bar attachment means for securing said yoke bar to said tongue proximate the distal end of the tongue;

means for selectively hitching an implement to be towed to said cart in a position rearward of said back end; and selectively actuable power takeoff means responsive, when actuated, to forward movement of said cart for providing output power to operate said implement;

wherein said tongue attachment means comprises:

first and second inter-engageable members secured to said frame and to the proximal end of said tongue, respectively, said first member having a first plurality of holes defined therein at a laterally extending series of respective spaced locations, said second member having a lesser plurality of apertures defined therein at a laterally extending series of respective spaced locations, wherein the spacing between said adjacent holes corresponds to the spacing between adjacent apertures to permit the lesser plurality of apertures in said second member to be selectively alignedly paired with a like plurality of holes in said first member; and a plurality of locking pins, each for engaging said first and second members to one another at a respective pair of an aligned aperture and hole, each pin being securable in and removable from its aligned aperture and hole by hand without requiring the use of a tool.

2. The assembly according to claim 1 wherein said first inter-engageable member comprises an elongated drawbar having a predetermined thickness and extending laterally across the front end of said frame, each of said holes extending entirely through the thickness of said drawbar; and wherein said second inter-engageable member includes a clevis affixed to the proximal end of said tongue and having two plates spaced from one another by a distance sufficient to engagedly receive said drawbar by inserting a forward facing edge of the drawbar between the two plates, wherein each of said apertures is defined through the thickness of both of said plates to permit each of plural holes in said drawbar to be aligned with a respective aperture in each of said plates;

whereby lateral repositioning of said tongue may be effected by disengaging said pins from said drawbar and clevis by hand without the use of a tool, repositioning the clevis to newly align its apertures with other holes in the drawbar, and reinserting and securing said pins in the newly aligned holes and apertures by hand without the use of a tool.

3. The assembly according to claim 2 further comprising first and second support arms extending forwardly and downwardly from said front end of said frame in spaced parallel relation, and means for mounting said drawbar between said first and second support arms for pivotal movement about a horizontal axis extending laterally in front of said cart below the level of said frame, whereby said tongue is pivotable in a vertical plane with said drawbar about said horizontal axis to accommodate variations in terrain experienced by said cart.

4. The assembly according to claim 3 wherein said clevis comprises:

first and second guide members secured adjacent opposite lateral sides of said tongue at its proximal end;

a top plate overlying said guide members and the adjacent proximal end of said tongue, said top plate extending rearwardly of said guide members and said tongue to provide one side of said clevis; and a bracket extending rearwardly from said guide members and said tongue;

wherein said bracket and said top plate correspond to said two plates of said second inter-engageable member.

5. The assembly according to claim 4 further comprising means for connecting a doubletree hitching apparatus to said top plate of said clevis.

6. The assembly according to claim 4 wherein said yoke bar attachment means comprises:

a sequence of tongue holes extending entirely through the thickness of said tongue in longitudinally spaced relation near the distal end of the tongue;

a first stop pin extending entirely through and secured to said tongue at the most distal of said series of tongue holes;

a second stop pin extending entirely through and secured to said tongue at selectable holes rearward of said most distal hole in said sequence;

wherein said first and second stop pins are longer than the thickness of said tongue; and a yoke ring secured to said yoke bar and disposed in circumscribed relation about said tongue between said first and second stop pins, said yoke ring having a diameter larger than the largest transverse dimension of said tongue but smaller than the length of said stop pins to thereby prevent said yoke ring from moving forward beyond said first stop pin and rearward beyond said second pin.

7. The assembly according to claim 6 further comprising clutch means engageable from above said cart frame for selectively actuating said power takeoff means.

8. The assembly according to claim 7 wherein said clutch means comprises:

manually actuable lever means for selectively engaging and disengaging said clutch means in response to actuated and unactuated pivot positions of said lever means;

bias means for urging said lever means toward said unactuated position;

stop means for preventing return of said lever means to said unactuated position from said actuated position; and selectively actuable release means for overriding said stop means to permit return of said lever means to said unactuated position from said actuated position.

9. The assembly according to claim 8 wherein said means for selectively hitching comprises a three-point hitch assembly having first and second spaced driver arms selectively pivotable about a common laterally extending axis, first and second sidelinks connected to said first and second driver arms so as to be raised and lowered in response to pivotal movement of said driver arms, first and second lift arms mounted for pivotable movement about a further laterally extending axis and connected to said first and second sidelinks, respectively, to be pivotable in response to raising and lowering of said sidelinks by said driver arms, and first and second coupling means for coupling said first and second driver arms, respectively, to said first and second sidelinks, respectively, to permit rotation of said sidelinks relative to said driver arms about both horizontal and vertical axes, thereby permitting selective lateral repositioning of said implement relative to said cart frame when said implement is hitched to be raisable and lowerable with said lift arms.

10. The assembly according to claim 1 wherein said yoke bar attachment means comprises:
- a sequence of tongue holes extending entirely through the thickness of said tongue in longitudinally spaced relation near the distal end of the tongue;
- a first stop pin extending entirely through and secured to said tongue at the most distal of said series of tongue holes;
- a second stop pin extending entirely through and secured to said tongue at selectible holes in said sequence rearward of said most distal hole;
- wherein said first and second stop pins are longer than the thickness of said tongue; and
- a yoke ring secured to said yoke bar and disposed in circumscribed relation about said tongue between said first and second stop pins, said yoke ring having a diameter larger than the largest transverse dimension of said tongue but smaller than the length of said stop pins to thereby prevent said yoke ring from moving forward beyond said first stop pin and rearward beyond said second pin.

11. The assembly according to claim 1 further comprising clutch means engageable from above said cart frame for selectively actuating said power takeoff means.

12. The assembly according to claim 11 wherein said clutch assembly comprises:
- manually actuatable lever means for selectively actuating and deactuating said clutch means in response to actuated and unactuated pivot positions of said lever means;
- bias means for urging said lever means toward said unactuated position;
- stop means for preventing return of said lever means to said unactuated position from said actuated position; and
- selectively actuable release means for overriding said stop means to permit return of said lever means to said unactuated position from said actuated position.

13. The assembly according to claim 1 wherein said means for selectively hitching comprises a three-point hitch assembly having first and second spaced driver arms selectively pivotable about a common laterally extending axis, first and second sidelinks connected to said first and second driver arms so as to be raised and lowered in response to pivotal movement of said driver arms, first and second lift arms mounted for pivotable movement about a further laterally extending axis and connected to said first and second sidelinks, respectively, to be pivotable in response to raising and lowering of said sidelinks by said driver arms, and first and second coupling means for coupling said first and second driver arms, respectively, to said first and second sidelinks, respectively, to permit rotation of said sidelinks relative to said driver arms about both horizontal and vertical axes, whereby to permit selective lateral repositioning of said implement relative to said cart frame when said implement is hitched so as to be raisable and lowerable with said lift arms.

14. A horse driven hitch cart assembly for towing and operatively driving farm implements comprising:
- a cart frame having front and back ends and first and second sides;
- an elongated tongue for stably positioning one or more draft horses forwardly of said front end, said tongue having proximal and distal ends;
- tongue attachment means for securing the proximal end of said tongue to extend forwardly from said cart;
- yoke means for attachment to one or more draft horse harnesses and including a yoke bar;
- yoke bar attachment means for securing said yoke bar to said tongue proximate the distal end of the tongue;
- means for selectively hitching an implement to be towed to said cart in a position rearward of said back end; and
- selectively actuable power takeoff means responsive, when actuated, to forward movement of said cart for providing output power to operate said implement;
- wherein said yoke bar attachment means comprises:
  - a sequence of tongue holes extending entirely through the thickness of said tongue in longitudinally spaced relation near the distal end of the tongue;
  - a first stop pin extending entirely through and secured to said tongue at the most distal of said series of tongue holes;
  - a second stop pin extending entirely through and secured to said tongue at selectable holes in said sequence rearward of said most distal hole;
  - wherein said first and second stop pins are longer than the thickness of said tongue; and
  - a yoke ring secured to said yoke bar and disposed in circumscribed relation about said tongue between said first and second stop pins, said yoke ring having a diameter larger than the largest transverse dimension of said tongue but smaller than the length of said stop pins to thereby prevent said yoke ring from moving forward beyond said first stop pin and rearward beyond said second pin.

15. The assembly according to claim 14 further comprising clutch means engageable from above said cart frame for selectively actuating said power takeoff means;

wherein said clutch means comprises:
- manually actuable lever means for selectively engaging and disengaging said clutch means in response to actuated and unactuated pivot positions of said lever means;
- bias means for urging said lever means toward said unactuated position;
- stop means for preventing return of said lever means to said unactuated position from said actuated position; and
- selectively actuable release means for overriding said stop means to permit return of said lever means to said unactuated position from said actuated position.

16. The assembly according to claim 14 wherein said means for selectively hitching comprises a three-point hitch assembly having first and second spaced driver arms selectively pivotable about a common laterally extending axis, first and second sidelinks connected to said first and second driver arms so as to be raised and lowered in response to pivotal movement of said driver arms, first and second lift arms mounted for pivotable movement about a further laterally extending axis and connected to said first and second sidelinks, respectively, to be pivotable in response to raising and lowering of said sidelinks by said driver arms, and first and second coupling means for coupling said first and second driver arms, respectively, to said first and second sidelinks, respectively, to permit rotation of said sidelinks relative to said driver arms about both horizontal and vertical axes, thereby permitting selective lateral repositioning of said implement relative to said cart frame when said implement is hitched to be raisable and lowerable with said lift arms.

17. A horse driven hitch cart assembly for towing and operatively driving farm implements comprising:
- a cart frame having front and back ends and first and second sides;
- an elongated tongue for stably positioning one or more draft horses forwardly of said front end, said tongue having proximal and distal ends;
- tongue attachment means for securing the proximal end of said tongue to extend forwardly from said cart;
- yoke means for attachment to one or more draft horse harnesses and including a yoke bar;
- yoke bar attachment means for securing said yoke bar to said tongue proximate the distal end of the tongue;
- means for selectively hitching an implement to be towed to said cart in a position rearward of said back end; and
- selectively actuable power takeoff means responsive, when actuated, to forward movement of said cart for providing output power to operate said implement; and
- further comprising clutch means engageable from above said cart frame for selectively actuating said power takeoff means, wherein said clutch means comprises:
  - manually actuatable lever means for selectively engaging and disengaging said clutch means in response to actuated and unactuated pivot positions of said lever means;
  - bias means for urging said lever means toward said unactuated position;
  - stop means for preventing return of said lever means to said unactuated position from said actuated position; and
  - selectively actuable release means for overriding said stop means to permit return of said lever means to said unactuated position from said actuated position.

18. The assembly according to claim 17 wherein said means for selectively hitching comprises a three-point hitch assembly having first and second spaced driver arms selectively pivotable about a common laterally extending axis, first and second sidelinks connected to said first and second driver arms so as to be raised and lowered in response to pivotal movement of said driver arms, first and second lift arms mounted for pivotable movement about a further laterally extending axis and connected to said first and second sidelinks, respectively, to be pivotable in response to raising and lowering of said sidelinks by said driver arms, and first and second coupling means for coupling said first and second driver arms, respectively, to said first and second sidelinks, respectively, to permit rotation of said sidelinks relative to said driver arms about both horizontal and vertical axes, thereby permitting selective lateral repositioning of said implement relative to said cart frame when said implement is hitched to be raisable and lowerable with said lift arms.

19. A horse driven hitch cart assembly for towing and operatively driving farm implements comprising:
- a cart frame having front and back ends and first and second sides;
- an elongated tongue for stably positioning one or more draft horses forwardly of said front end, said tongue having proximal and distal ends;
- tongue attachment means for securing the proximal end of said tongue to extend forwardly from said cart;
- yoke means for attachment to one or more draft horse harnesses and including a yoke bar;
- yoke bar attachment means for securing said yoke bar to said tongue proximate the distal end of the tongue;
- means for selectively hitching an implement to be towed to said cart in a position rearward of said back end; and
- selectively actuable power takeoff means responsive, when actuated, to forward movement of said cart for providing output power to operate said implement; and
- further comprising clutch means engageable from above said cart frame for selectively actuating said power takeoff means wherein said means for selectively hitching comprises a three-point hitch assembly having first and second spaced driver arms selectively pivotable about a common laterally extending axis, first and second sidelinks connected to said first and second driver arms so as to be raised and lowered in response to pivotal movement of said driver arms, first and second lift arms mounted for pivotable movement about a further laterally extending axis and connected to said first and second sidelinks, respectively, to be pivotable in response to raising and lowering of said sidelinks by said driver arms, and first and second coupling means for coupling said first and second driver arms, respectively, to said first and second sidelinks, respectively, to permit rotation of said sidelinks relative to said driver arms about both horizontal and vertical axes, thereby permitting selective lateral repositioning of said implement relative to said cart frame when said implement is hitched to be raisable and lowerable with said lift arms.

20. A horse driven hitch cart assembly for towing and operatively driving farm implements comprising:
   a cart frame having front and back ends and first and second sides;
   an elongated tongue for stably positioning one or more draft horses forwardly of said front end, said tongue having proximal and distal ends;
   tongue attachment means for securing the proximal end of said tongue to extend forwardly from said cart;
   yoke means for attachment to one or more draft horse harnesses and including a yoke bar;
   yoke bar attachment means for securing said yoke bar to said tongue proximate the distal end of the tongue;
   means for selectively hitching an implement to be towed to said cart in a position rearward of said back end; and
   selectively actuable power takeoff means responsive, when actuated, to forward movement of said cart for providing output power to operate said implement;
   wherein said tongue attachment means comprises:
      first and second inter-engageable members secured to said frame and to the proximal end of said tongue, respectively, said first member having a first plurality of holes defined therein at a laterally extending series of respective spaced locations, said second member having a lesser plurality of apertures defined therein at a laterally extending series of respective spaced locations, wherein the spacing between said adjacent holes corresponds to the spacing between adjacent apertures to permit the lesser plurality of apertures in said second member to be selectively alignedly paired with a like plurality of holes in said first member; and
      a plurality of locking pins, each for engaging said first and second members to one another at a respective pair of an aligned aperture and hole, each pin being securable in and removable from its aligned aperture and hole by hand without requiring the use of a tool;
   wherein said yoke bar attachment means comprises:
      a sequence of tongue holes extending entirely through the thickness of said tongue in longitudinally spaced relation near the distal end of the tongue;
      a first stop pin extending entirely through and secured to said tongue at the most distal of said series of tongue holes;
      a second stop pin extending entirely through and secured to said tongue at selectable holes in said sequence rearward of said most distal hole;
   wherein said first and second stop pins are longer than the thickness of said tongue; and
      a yoke ring secured to said yoke bar and disposed in circumscribed relation about said tongue between said first and second stop pins, said yoke ring having a diameter larger than the largest transverse dimension of said tongue but smaller than the length of said stop pins to thereby prevent said yoke ring from moving forward beyond said first stop pin and rearward beyond said second pin; and further comprising clutch means engageable from above said cart frame for selectively actuating said power takeoff means.

* * * * *